United States Patent
Duebel et al.

(10) Patent No.: US 6,708,715 B2
(45) Date of Patent: Mar. 23, 2004

(54) PNEUMATIC PRESSURE CONTROL DEVICE

(75) Inventors: Rainer Duebel, Baldham (DE); Stefan Burger, München (DE)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 10/130,024

(22) PCT Filed: May 25, 2001

(86) PCT No.: PCT/EP01/05992

§ 371 (c)(1), (2), (4) Date: May 13, 2002

(87) PCT Pub. No.: WO01/95045

PCT Pub. Date: Dec. 13, 2001

(65) Prior Publication Data

US 2002/0192037 A1 Dec. 19, 2002

(30) Foreign Application Priority Data

Jun. 6, 2000 (DE) .......................... 100 27 873

(51) Int. Cl.[7] ................................. G05D 7/00
(52) U.S. Cl. .......................... 137/102; 406/92
(58) Field of Search .................. 137/102; 406/92

(56) References Cited

U.S. PATENT DOCUMENTS

| 3,086,542 A | * | 4/1963 | Mosier ........................ 137/102 |
| 4,041,970 A | * | 8/1977 | Peters ........................ 137/102 |
| 4,246,921 A | * | 1/1981 | Beccaria et al. ............. 137/102 |
| 4,397,505 A | * | 8/1983 | Linkner, Jr. .................... 303/9 |
| 4,480,947 A | * | 11/1984 | Nagasaka .................... 406/14 |
| 4,861,232 A | | 8/1989 | Ise et al. |
| 4,932,630 A | | 6/1990 | Kumar et al. |
| 5,305,777 A | * | 4/1994 | Nakamura et al. .......... 137/102 |
| 6,443,670 B1 | * | 9/2002 | Haas et al. .................... 406/93 |

FOREIGN PATENT DOCUMENTS

| DE | 38 18 380 A1 | 12/1988 |
| DE | 43 02 951 C1 | 5/1994 |
| EP | 0 906 010 | 3/1999 |

* cited by examiner

Primary Examiner—Joseph A. Dillon
(74) Attorney, Agent, or Firm—Hoffmann & Baron, LLP

(57) ABSTRACT

A pressure control means comprising a jet pump (1) whose pressure state in a branch flow duct (4) may be changed by means of a choke (6), which influences the spent air flow from the jet pump (1). This renders possible a rapid and stepless variation of the pressure state in the branch flow duct (4).

10 Claims, 1 Drawing Sheet

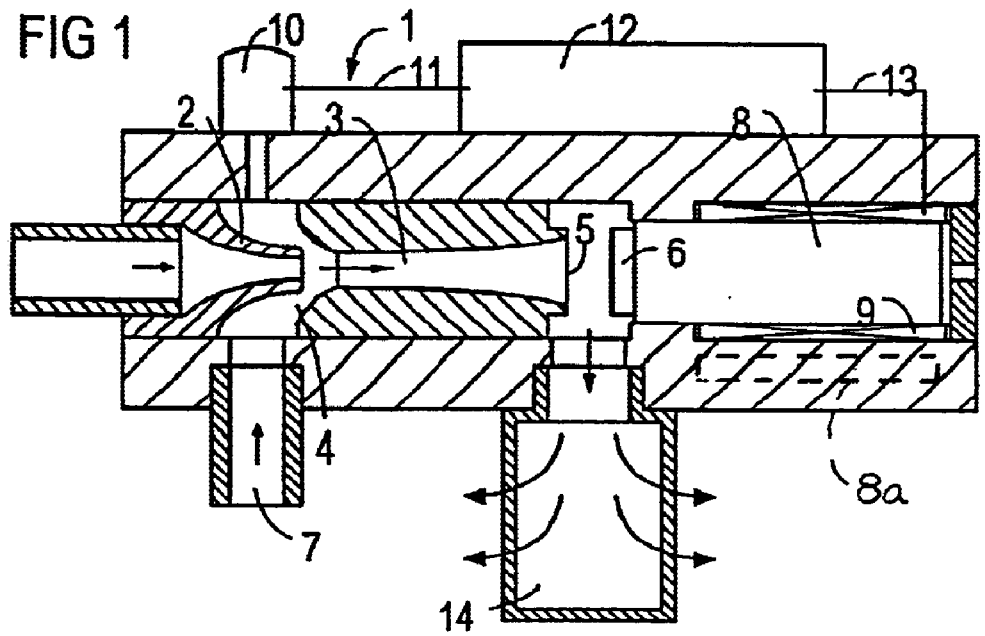
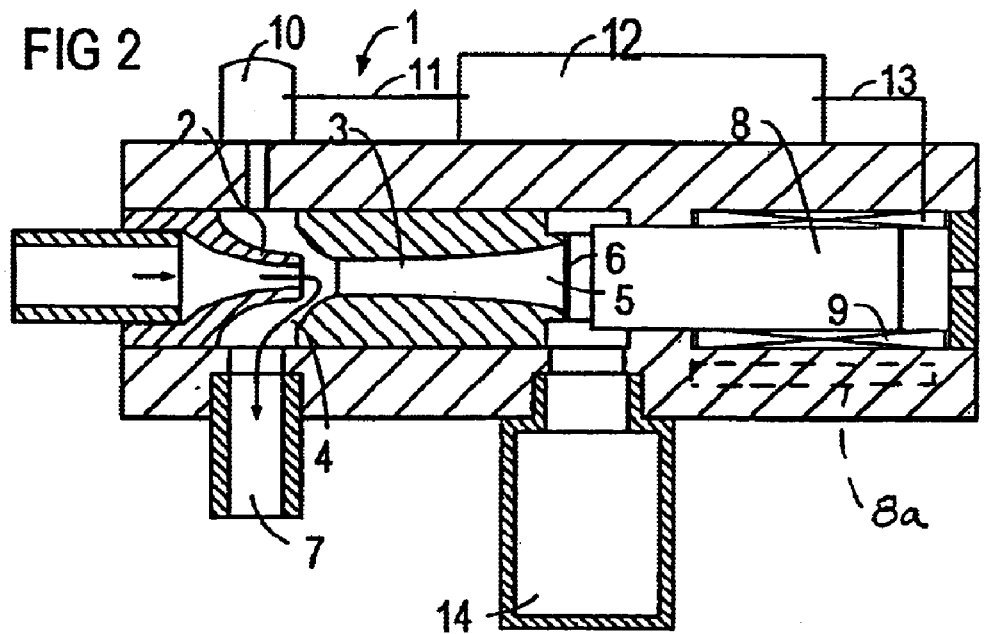

PNEUMATIC PRESSURE CONTROL DEVICE

FIELD OF THE INVENTION

The invention relates to a pneumatic pressure control means for the production of at least two different pressures in a load line by the use of adjustment means.

BACKGROUND OF THE INVENTION

Conventionally different pressures are made available in a load line by switching over a three way valve between two supply lines, which carry the desired pressures.

Furthermore it is a customary practice to utilize jet pumps to produce vacuum, in the case of which a jet tube nozzle carrying a fluid under gage pressure injects such fluid into a principal flow duct. In the transition zone between the jet nozzle and the principal flow duct a branch flow duct is provided in which vacuum is produced owing to the high flow speed of the medium.

SUMMARY OF THE INVENTION

One object of the invention is to provide a simple means by which pressures with different levels may be produced in a connected load line.

The pressure differences required in the branch flow duct are produced by influencing the principal flow without a valve being necessary for this purpose. Since the back pressure is influenced without making physical contact, use is more particularly advantageous in cases where frequent and rapid changes in pressure are required. The back pressure means may for example be in the form of a counter pressure nozzle directed against the outlet flow opening, whose flow rate may be changed. The back pressure means may furthermore be in the form of slides able to be moved, for example perpendicularly to the principal flow duct. A particular advantage of the invention is that only one supply duct is required, which may be more readily laid and connected as a double line in a restricted space. This means that it is possible to arrange the control means close to the load so that the change in pressure may take place particularly rapidly.

The influence on flow may be for example so set that the flow speed in the principal duct is reduced and the vacuum effective in the branch flow duct is eliminated or, dependent on the size of the back pressure, is converted into gage pressure. In this respect it is an advantage for the principal flow duct to be designed so that it flares like a trumpet toward the outlet opening in order to achieve flow with a minimum resistance. The back pressure means may, for example, be usch as to be able to be set in only two functional positions so that the pressure control means is merely effective as a sort of two way valve. It is however also possible to provide a multi-stage setting or adjustment so as to have any desired number of output pressures.

A baffle-like choke may be actuated by a shifting movement toward the outlet flow opening or athwart same without any mutual contact occurring. This simplifies the mechanical actuation and function of the pneumatic operations and may take place without mechanical wear, the choke being mechanically simple in design and as regards its guide means.

Therefore, as a result of the present invention, it is possible to regulate the pressures required in fine steps and to adapt same to various different conditions of use.

A displacement measuring means further renders possible a rapid movement of the choke into a predetermined position with a correspondingly defined pressure in the load line.

A pressure sensor and a control make it possible for the pressure in the load line to be set precisely and contact in a manner independent from the flow rate.

Linear drives produce a high hold and setting force so that a rapid setting action on the choke and reliable holding in the set position is possible. A moving coil may for example be designed like a loudspeaker and be coupled with a diaphragm sealing off the coil space so that same may be filled with a damping liquid.

In the following the invention will be described in detail with reference to the embodiments illustrated in accompanying drawings.

BRIEF DESCRIPTION OF THE DRAWINGS

FIG. 1 is a longitudinal section taken through a pneumatic pressure control means.

FIG. 2 shows pressure control means in another functional position.

DETAILED DESCRIPTION OF THE PREFERRED EMBODIMENTS

In FIG. 1 the reader will see a pneumatic pressure control means in an axial longitudinal section. A jet pump 1 possesses a jet nozzle 2 connected with a gage pressure line and directed toward a principal flow duct 3, which is designed as a sort of venturi nozzle. In the transition zone between the jet nozzle 2 and the principal flow duct 3 a branch flow duct 4 branches off perpendicularly to the principal flow duct 3, such branch duct flaring out in a trumpet-like form toward an outlet flow opening 5. The branch duct opens into a spent air chamber, which the medium leaves through a muffler 14 out into the surroundings. A load line 7 is connected with the branch flow duct 4.

A choke 6 is located at some distance from the outlet flow opening 5, which substantially prevents any back pressure in the exiting spent air. In the vicinity of the jet nozzle 2 the flow speed is so high that here a vacuum pressure develops. This vacuum pressure zone extends in the branch flow duct 4 and in the load line 7. The choke 6 is attached to a drive element, such as an electromagnetic actuator 8 which is operated in the axial direction by means of a control drive, such as an electrical coil 9 against the direction of the jet of exiting medium. A displacement measuring means 8a renders possible a rapid movement of the choke 6 into a predetermined position with a correspondingly defined pressure in the load line.

A pressure sensor 10 measures the pressure in the branch flow duct 4 and is connected by way of a data line 13 with an electrical controller 12 which is connected with the coil 9. Dependent on the amperage supplied by way of line 13 the inductivity of the coil will be changed together with the position of the electromagnetic actuator 8 with the choke 6.

FIG. 2 shows the baffle-like choke 6 in one position of switching, in which the distance from the outlet flow opening 5 is substantially reduced. The spent air is now not able to freely flow out and is subject to such a strong back pressure in the principal flow duct 3 that a gage pressure results in the branch flow duct 4.

What is claimed is:

1. A pneumatic pressure control means for producing at least two different pressures in a load line, said pneumatic pressure control means including a jet pump comprising:
    a branch flow duct connected to the load line;
    a principal flow duct communicating at one end with said branch flow duct and having an outlet flow opening at an opposite end thereof;

an adjustable back pressure means adjacent said outlet flow opening, said adjustable back pressure means influencing a pneumatic flow through said principal flow duct such that a pneumatic pressure in said branch flow duct may be changed;

a pressure sensor in communication with said branch flow duct for measuring the pressure therein and generating a pressure signal based on said measured pressure; and a controller connected to said pressure sensor and said adjustable back pressure means, said controller receiving said pressure signal from said pressure sensor and controlling said adjustable back pressure means based on said received signal.

2. A pressure control means as defined in claim 1, wherein said back pressure means comprises an adjustable choke, said choke being adjustable to change a flow cross-section of said outlet flow opening of said principal flow duct.

3. A pressure control means as defined in claim 2, wherein said adjustable choke is in the form of a baffle and is adjustable to be moved into a position in front of said outlet flow opening.

4. A pressure control means as defined in claim 3, wherein said adjustable choke is adjustable to be moved in an output flow direction toward said outlet flow opening.

5. A pressure control means as defined in claim 3, further comprising a drive element and a control drive for moving said drive element, said adjustable choke being attached to said drive element.

6. A pressure control means as defined in claim 5, wherein said control drive comprises a displacement measuring means.

7. A pressure control means as defined in claim 5, wherein said controller is connected to said pressure sensor and said control drive, said controller evaluating said pressure signal from said pressure sensor and controlling said control drive based on said received signal.

8. A pressure control means as defined in claim 5, wherein said drive element comprises a moving coil, said choke acting attached to said moving coil.

9. A pressure control means as defined in claim 5, wherein said drive element comprises an electromagnetic actuator having a moving magnet, said choke being attached to said moving magnet.

10. A pressure control means as defined in claim 5, wherein said drive element comprises a linear motor having a moving part, said choke being attached to said moving part.

* * * * *